United States Patent [19]

Lee

[11] Patent Number: 4,698,649

[45] Date of Patent: Oct. 6, 1987

[54] APPARATUS FOR CONTROLLING THE VELOCITY OF A MEMBER IN A DIGITAL PRINTING SYSTEM

[75] Inventor: Jerald D. Lee, Medenhall, Pa.

[73] Assignee: E. I. Du Pont De Nemours and Company, Wilmington, Del.

[21] Appl. No.: 804,136

[22] Filed: Dec. 3, 1985

[51] Int. Cl.$^4$ .............................................. G01D 9/42
[52] U.S. Cl. .................................................. 346/108
[58] Field of Search ................ 346/108, 107 R, 76 L; 358/296, 300

[56] References Cited

U.S. PATENT DOCUMENTS

| | | | |
|---|---|---|---|
| 3,488,123 | 1/1970 | Nichols | 356/106 |
| 3,994,583 | 11/1975 | Hutchins, IV | 356/28 |
| 4,005,936 | 2/1977 | Redman et al. | 356/5 |
| 4,086,808 | 5/1978 | Camac et al. | 73/655 |
| 4,299,492 | 11/1981 | Etzel et al. | 356/386 |
| 4,464,030 | 8/1984 | Gale et al. | 346/108 |
| 4,505,578 | 3/1985 | Balasurbramanian | 355/43 |
| 4,586,821 | 5/1986 | Chandra et al. | 356/363 |

OTHER PUBLICATIONS

Sprague, R. A., "Advances in Laser and E-O Printing Technology," *Laser Focus/Optics*, Oct. 1983, pp. 101–109.

B. Lehmann et al, "On-Axis Velocity Measurement by Laser Doppler Anemometry," *J. Phys. E.:Sci. Instrum.*, vol. 17, 1984, pp. 455–457.

Mertz, L., "Real-Time Fringe-Pattern Analysis, *Applied Optics*," vol. 22, No. 10, 15 May 1983, pp. 1535–1539.

"Laser Beams Speed Up Reticle Writing," *Electronics*, Oct. 7, 1985, pp. 40–42.

*Primary Examiner*—E. A. Goldberg
*Assistant Examiner*—Mark Reinhart

[57] ABSTRACT

A control system for controlling the velocity of a member in a printing system which utilizes a signal representative of the time variation in intensity produced by the Doppler shift between radiation reflected from the moving member and a reference signal to generate a control signal for correcting the velocity of the moving member. The control signal is applied to a servo mechanism to modify the velocity of the moving member in the appropriate manner.

1 Claim, 1 Drawing Figure

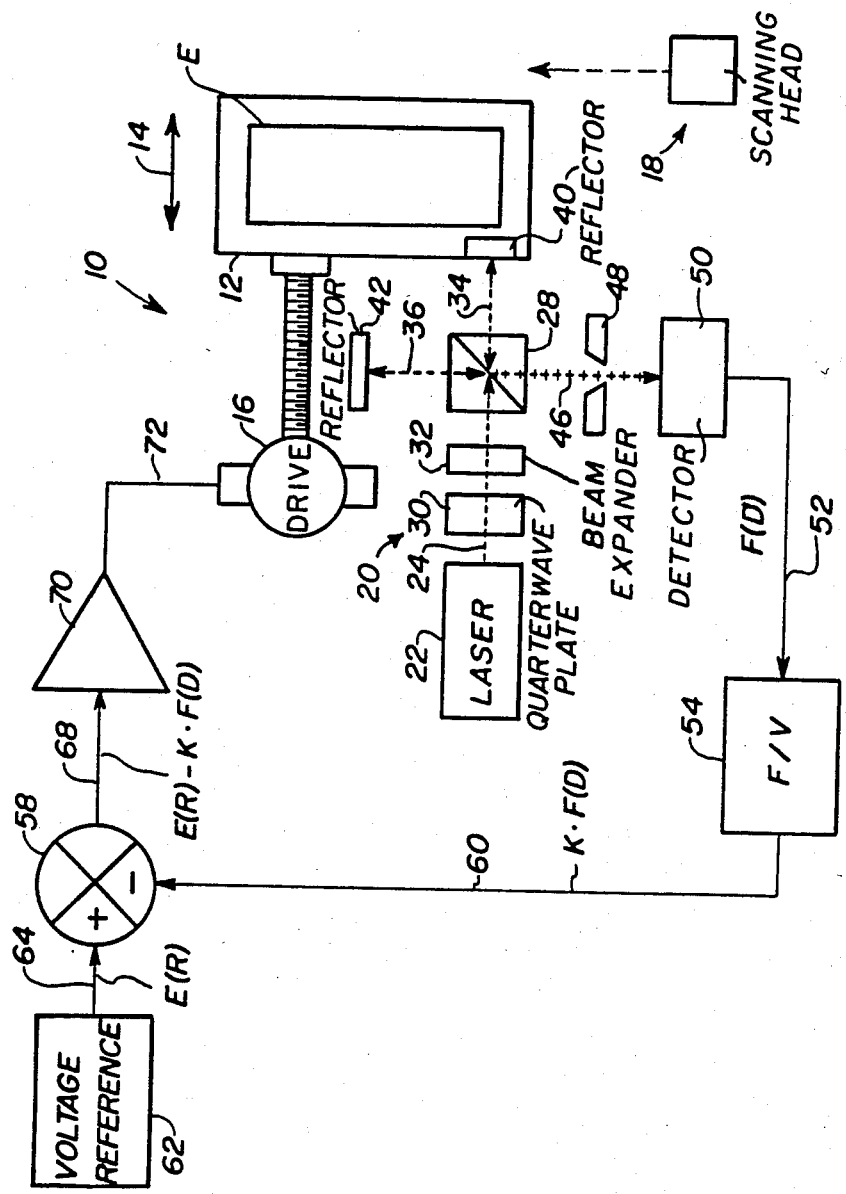

APPARATUS FOR CONTROLLING THE VELOCITY OF A MEMBER IN A DIGITAL PRINTING SYSTEM

BACKGROUND OF THE INVENTION

1. Field of the Invention

The present invention relates to a digital printing system and, in particular, to a digital printing system having an apparatus for controlling the velocity of a member.

2. Description of the Prior Art

To produce hard copy for digital printing, proofing or radiographic imaging systems, a photosensitive material is mounted on a substantially planar member known as a translation stage. The stage carries the photosensitive element rectilinearly along a relatively long travel path on the order of at least eight inches past a scanning laser beam. As the photosensitive element translates beneath a printing laser a beam of laser light is scanned in raster fashion across the element thereby recording the photographic or printed image onto the photosensitive element.

The scanned lines are relatively tightly spaced, with spacing between lines on the order of one hundred micrometers being not uncommon and with tolerances in that spacing being on the order of two micrometers. Accordingly, to avoid banding, the control of the motion of the stage must be made exceedingly exact. Banding is caused, for example, either by a redundancy of scan lines over the same area of the photosensitive element, the absence of a scan line or lines over some area of the element, or misplacement of scan lines. If banding occurs relatively long streaks extending in a direction perpendicular to the direction of motion of the stage member become obvious to the unaided eye. For certain types of imaging, such as in medical X-ray imagery, banded streaks cannot be tolerated since they interfere with the radiologist's ability to evaluate the radiogram. In other printing uses banding is objectionable due to its deleterious effect on the quality of the printed image.

Exempary of a velocity control arrangement for use in the environment of a digital printing system is that shown in U.S. Pat. No. 4,505,578 (Balasubramanian). This patent discloses a hydraulic braking arrangement for controlling the velocity of a stage member past a scanning head.

Velocity control schemes for use in connection with instruments performing high precision scientific research are known. For example, U.S. Pat. No. 3,488,123 (Nichols) relates to a velocity control scheme for controlling the velocity of a movable mirror of an interferometer used in experiments carried out in space craft. This device uses an electromechanical drive having a short travel distance, on the order of millimeters, and a radiation source with a limited coherence length. Such a control arrangement would not appear to be useful in the control of printing systems that require travel distances many times in excess of the travel path of the scientific instrument, particularly those using a less precisely controllable drive mechanism.

Accordingly, it is believed advantageous to provide a control arrangement for accurately controlling the velocity with which the translation stage is moved along a travel path at least eight inches in length.

SUMMARY OF THE INVENTION

In accordance with the present invention a printing system has a velocity control arrangement provided for accurately controlling the velocity with which a first member, such as a stage, translates with respect to a second member, such as a laser scanner. The travel path that the first member translates is relatively large, on the order of at least eight inches. The control apparatus includes a source of coherent radiation having a coherence length at least equal to twice the travel path of the first member. The output beam is split along a reference path and a measurement path. A reflector mounted on the first member and a fixed reflector are respectively interposed in the measurement and reference paths. The time variation in intensity produced by the interference of the coherent light beams reflected from the moving and the fixed reflectors is imposed on a detector which produces an output voltage. The frequency of the variation in intensity and, therefore, the frequency of the voltage signal output from the photodetector, is related to the actual velocity with which the first member is translated. The detector voltage is compared to a reference voltage signal representative of a predetermined reference velocity. The voltage difference is applied to a servo control network which controls the drive motor for the stage.

As a result, the velocity of the first member throughout its entire travel path is controlled so that the translation of the first member is brought as close to the predetermined reference velocity as possible. In this manner banding is reduced.

BRIEF DESCRIPTION OF THE DRAWINGS

The invention will be more fully understood from the following detailed description thereof taken in connection with the accompanying drawing in which the single FIGURE is a highly stylized pictorial representation of the velocity control apparatus in accordance with the present invention.

DETAILED DESCRIPTION OF THE INVENTION

A portion of a laser printing arrangement generally in accordance with the present invention is generally indicated by reference character 10. The printing system may be operated in a digital as well as an analog format. The printing system 10 includes a first member, such as a translation stage 12, mounted for rectilinear movement in opposed directions indicated by the double arrow 14 by means of a suitable drive arrangement 16. The drive arrangement 16 may be any precise mechanical, electrical, pneumatic or hydraulic drive, such as a worm gear, helical gear or pulley drive. Mounted on the stage 12 for translation along a relatively long travel path at least eight inches in length is a photosensitive element E. The element E is exposed as the stage 12 translates along the path of travel with respect to a second, fixed, member, such as a scanning head indicated diagrammatically by the reference character 18. Exemplary of a scanning head is that shown in Beiser, Laser Scanning Systems, Laser Applications, Monte Ross, Editor, Academic Press 1974.

As noted earlier deleterious banding of the photographic copy of the element E may be produced. To reduce this occurrence, the printing system 10 includes a velocity control system 20. The control system 20 includes a laser-doppler feedback control system arranged to interact operatively with the stage 12 and the drive motor 16 thereof to precisely control the velocity of the stage.

The velocity control system 20 includes a helium neon laser 22 which emits a beam 24 of coherent radiation. The beam 24 from the laser 22 has a coherence length at least equal to twice that of length of the travel path of the stage 12. The outlet beam 24 is passed to a beam splitter 28 through a quarter wave plate 30 and a beam expander 32. A polarizer may be interposed between the laser 22 and the quarter wave plate 30. The beam splitter 28 operates to split the incident beam 24 into measurement and reference beams 34 and 36, respectively. Mounted on the stage 12 and interposed in the path of the measurement beam 34 is a reflector 40. The reflector 40 travels with the stage 12 as the same is translated in the directions of the arrow 14. A fixed reflector 42 is interposed in the reference beam path 36. The portion of radiation reflected from the reflectors 40 and 42 are rejoined and propagate along a resultant beam path 46 which is directed through an aperture 48 onto a silicon photodetector 50 such as a PIN 020P manufactured by United Detector Technology, Inc. The beam reflected from the reflector 40 is frequency shifted in accordance with the well-documented Doppler effect. Accordingly, the intensity of the resultant beam propagating along the path 46 varies in time at a frequency which is determined by the difference between the frequency of the radiation reflected from the fixed reflector 40 as compared to the frequency of the radiation reflected from the reflector 40 on the stage 12. The difference in frequencies between the reflected beams on the reference and measurement paths 36 and 34, respectively, is directly related to the velocity with which the stage 12 is translated relative to the laser source 22. These elements therefore cooperate to form means which produce a beam having a time-varying intensity the frequency of which is functionally related to the actual velocity of the movable first member.

The detector 50 produces on an output line 52 a voltage signal, the detected frequency F(D) of which varies with and corresponds to the frequency of the intensity changes in the beam propagating along the path 46. With stage velocity constant the detector 50 senses a constant time variation in intensity. However, as the velocity of the stage 12 changes as it moves faster or slower from the laser source 22 there is a concomitant increase or decrease in the frequency of the intensity variation of the beam propagating along the path 46. The output from the detector 50 is applied over a line 52 to a frequency to voltage converter 54 such as that manufactured by Analog Devices Inc. and sold as model number AD650.

The voltage output from the device 54 is indicated in the drawings as K·F(D), where K is a predetermined constant and is applied to a summing junction 58 over a line 60. At the junction 58 the voltage output from the device 54 is summed with a voltage output from a suitable reference voltage source 62. The value of the reference signal is representative of a predetermined reference velocity at which it is desired to move the stage 12. The output of the source 62, indicated as E(R) in the drawing, is applied over the line 64 to the junction 58 where it is summed with the voltage on the line 60 corresponding to the frequency of the intensity variation of the beam 46. The error signal E(R) minus K·F(D) is applied over a line 68 to an amplifier 70 forming part of a servo mechanism which applies a control signal over line 72 to appropriately alter the speed of the motor 16 such that the error signal on the line 68 is driven towards zero thereby to maintain the velocity of the stage at substantially the predetermined reference velocity.

The choice of a laser source 22 is critical in order to maintain coherency of the incident radiation over the entire path of travel of the stage so that measurements of the accuracy required in the present environment may be obtained.

Those skilled in the art having benefit of the teachings of the present invention as hereinabove set forth may effect numerous modifications thereto. For example, it lies within the contemplation to use the velocity control arrangement as herein described in a printing system in which the scanning head 18 is rectilinearly displaced with respect to a fixed stage 12. In this instance the mirror 40 would be appropriately mounted on the movable member, i.e., the head 18. In the terminology hereinbefore used the head 18 would be the "first member" (i.e., the movable member, while the stage 12 would be the "second", fixed, member. These and other modifications are, however, to be construed as lying within the scope of the present invention as set forth in the appended claims.

What is claimed is:

1. In a printing apparatus of the type having a first member movable rectilinearly along a path of travel with respect to a second member, the path of travel being at least eight inches in length, the improvement which comprises a velocity control system for controlling the velocity at which the first member is moved, the control system comprising:

a source of laser light having a coherence length equal to at least twice the path of travel of the first member;

means including a pair of light reflecting elements, one of which is mounted on the first member, for producing a beam having a time varying intensity the frequency of which is functionally related to the actual velocity of the first member;

means responsive to the time varying intensity for generating an electrical signal representative of the actual velocity of the first member; and a servo system responsive to the electrical signal for driving the error between the actual velocity electrical signal and a reference velocity electrical signal toward zero thereby to maintain the velocity of the first member at substantially a predetermined reference velocity.

* * * * *